US008375461B2

(12) United States Patent
Reckless

(10) Patent No.: US 8,375,461 B2
(45) Date of Patent: *Feb. 12, 2013

(54) APPARATUS FOR AND A METHOD OF COPY-PROTECTING A CONTENT CARRYING RECORDING MEDIUM

(75) Inventor: Jonny Boyd Reckless, Maidenhead (GB)

(73) Assignee: Rovi Solutions Corporation, Santa Clara, CA (US)

( * ) Notice: Subject to any disclaimer, the term of this patent is extended or adjusted under 35 U.S.C. 154(b) by 1123 days.

This patent is subject to a terminal disclaimer.

(21) Appl. No.: 11/724,070

(22) Filed: Mar. 14, 2007

(65) Prior Publication Data

US 2008/0225665 A1 Sep. 18, 2008

(51) Int. Cl.
*G06F 11/00* (2006.01)
(52) U.S. Cl. ........................................................ 726/33
(58) Field of Classification Search .................. 380/201, 380/203; 726/32, 33
See application file for complete search history.

(56) References Cited

U.S. PATENT DOCUMENTS

| 6,490,683 | B1 * | 12/2002 | Yamada et al. ............... 713/176 |
| 7,065,290 | B2 * | 6/2006 | Yoshimura et al. ........... 386/252 |
| 2002/0069389 | A1 * | 6/2002 | Sollish et al. ................. 714/758 |
| 2002/0144123 | A1 | 10/2002 | Newman | |
| 2002/0159355 | A1 | 10/2002 | Heylen et al. | |
| 2003/0149885 | A1 * | 8/2003 | Fang et al. ..................... 713/193 |
| 2003/0185130 | A1 | 10/2003 | Kamperman et al. | |
| 2004/0158530 | A1 | 8/2004 | Moritomo | |
| 2004/0205442 | A1 * | 10/2004 | Chuang et al. ................. 714/784 |
| 2005/0185926 | A1 * | 8/2005 | Basile et al. .................... 386/94 |

FOREIGN PATENT DOCUMENTS

| JP | 2001-135019 A | 5/2001 |
| WO | WO 02/11136 A1 | 2/2002 |
| WO | WO-2005/081245 A2 | 9/2005 |
| WO | WO-2005/081245 A3 | 9/2005 |

OTHER PUBLICATIONS

Immink, Kees A. Schouhamer, EFMPlus : The Coding Format of the Multimedia Compact Disc, IEEE Transactions on Consumer Electronics, vol. 41, No. 3, Aug. 1995, pp. 491-497.
120 mm DVD Rewritable Disk (DVR-RAM), Standard ECMA-272, $2^{nd}$ Editon—Jun. 1999, ECMA Standardizing Information and Communication Systems, pp. 14-23.
Pioneer Corporation DVD Technical Guide, Chapter 2 Physical Format of Read-Only Discs ( 2.32-2.3.5), http://pioneer.jp/crdl/tech/dvd/2-3-e.html, downloaded Dec. 2, 2007, 3 pages.
International Search Report for International application No. PCT/US2008/002895 dated Jul. 11, 2008, 1 page.

* cited by examiner

*Primary Examiner* — Ellen Tran
(74) *Attorney, Agent, or Firm* — Schwegman Lundberg & Woessner, P.A.

(57) ABSTRACT

Apparatus and a method are described for providing, for recordal onto a recording medium, recording data having content data and control data for enabling a player playing such a recording medium to navigate through the content data. The apparatus has a copy protector to copy-protect the recording data by controlling the production of parameters that are associated with items of data in the recording data but that are not checked by a physical testing device such that a parameter associated with an item of the recording data that is not on the navigation path is inconsistent with that item of data, or is otherwise not as expected, to cause a copying device reading that the item of data to report an error, thereby inhibiting copying by that copying device.

7 Claims, 8 Drawing Sheets

APPARATUS FOR AND A METHOD OF COPY-PROTECTING A CONTENT CARRYING RECORDING MEDIUM

FIELD OF THE INVENTION

This invention relates to an apparatus for and a method of copy-protecting a content carrying recording medium against unauthorised copying of that content where the recording medium is an optical disc (or precursor to an optical disc) or other recording medium on which content data can be accessed in a non-sequential manner using navigational data stored by the recording medium, to recording medium having such copy protection and to a copy-protected data file for recordal on a recording medium. For simplicity, a recording medium such as an optical disc or other recording medium on which content data can be accessed in a non-sequential manner using navigational data stored by the recording medium is referred to hereinafter simply as a "recording medium".

BACKGROUND OF THE INVENTION

The advent of digital recording techniques has enabled digital copies of digital content carried by recording media such as optical discs (for example DVDs) to be made with little or no loss of copy quality. This makes it easy for an unauthorised person to produce unauthorised copies of digital content-carrying recording media. Accordingly, copy-protection techniques have been developed. Most current copy-protection techniques exploit differences in the ways a legitimate player and an unauthorised copying apparatus or "ripper" would access a recording medium in order to defeat copying while preserving good playability.

A legitimate DVD player follows a navigational path on the DVD that is defined by navigational commands and control data carried by the DVD whereas most unauthorised copying apparatus or rippers access the content of a DVD file-by-file or sector-by-sector. One way of frustrating production of good quality or playable copies by a file-by-file or sector-by-sector unauthorised copying apparatus is to include subversive data (that is data that detrimentally affects at least one of the copying process, copy quality and playability of a copy) in a sector that does not form part of the navigational path of the DVD. Such a subversive sector will be ignored by a legitimate player because it does not form part of the navigational path. However, a file-by-file or sector-by-sector unauthorised copying apparatus trying to copy the DVD would encounter the subversive sector and, as a result, would report an error and would be unable to read the DVD.

Current techniques for producing a subversive or unreadable sector include techniques that modify or corrupt the digital sum value (DSV), corrupt inner or outer parity codes or otherwise corrupt the EFM+ (eight to fourteen modulation plus) data stream for that sector in some way. These techniques can, however, cause a physical testing device testing a legitimate copy-protected DVD to report that a copy-protected DVD is unsatisfactory because the physical testing device may detect inner or outer parity errors, jitter, timing errors, radial noise, poor reflectivity or the like when the physical testing device encounters the copy-protected sector(s). Accordingly, physical testing of such copy-protected DVDs requires modification of the software used by the physical testing device to enable such a copy-protected DVD to receive a clean or satisfactory test report. For example "plug-ins" may need to be specially developed to enable the physical testing device to deal with each particular different type of copy-protection.

SUMMARY OF THE INVENTION

In one aspect, the present invention provides apparatus for providing, for recordal onto a recording medium, recording data having content data and control data for enabling a player playing such a recording medium to navigate through the content data, wherein the production of parameters that are associated with items of data in the recording data but that are not checked by a physical testing device are controlled such that a parameter associated with an item of the recording data that is not on the navigation path is inconsistent with that item of data, or is otherwise not as expected, thereby producing subversive data to cause a copying device, such as a file-by-file or sector-by-sector ripper, reading that item of data to report an error, thereby inhibiting copying by that copying device. This manner of incorporating subversive data enables a copy-protected recording medium to be produced that can be tested by a physical testing device without the physical testing device having to be aware of the manner of copy-protection or having to use specific software (such as a software "plug-in") specifically designed for recording media having that type of copy-protection. A legitimate player will of course not read the subversive data (because it is not part of the navigation path) and so will be unaffected by the inconsistency.

The invention also provides a method of providing such recording data, the recording data itself and a recording medium, such as a DVD, carrying the recording data.

An embodiment provides a copy-protected data file to be recorded on an optical disc such as a DVD in which, amongst the parameters associated with sectors or files of data in the recording data that are not checked by a physical testing device, at least one said parameter associated with a sector or file not on the navigational path or paths of the DVD is inconsistent with the data of that sector or file and thus constitutes subversive data that causes a copying device (such as a file-by-file or sector-by-sector ripper) reading the sector or file having the inconsistent parameter to report an error thereby inhibiting copying whilst still allowing physical testing of the DVD.

The parameter may be made inconsistent by modification or corruption. The parameter may be made inconsistent by producing that parameter using a procedure different from that expected by a copying deice or a legitimate player, for example in the case of recording data to be recorded on a DVD by producing that parameter using a procedure not in accordance with the procedure set out in the appropriate DVD standard.

The recording medium may be an optical disc such as a DVD or a precursor thereof such as Digital Linear Tape, glass master, or stamping master, or may be any other form of recording medium from which content data that can be accessed in a non-sequential manner using navigational data stored by the recording medium.

BRIEF DESCRIPTION OF THE DRAWINGS

Embodiments of the present invention will now be described, by way of example, with reference to the accompanying drawings, in which.

DETAILED DESCRIPTION OF EMBODIMENTS

Figure 1:
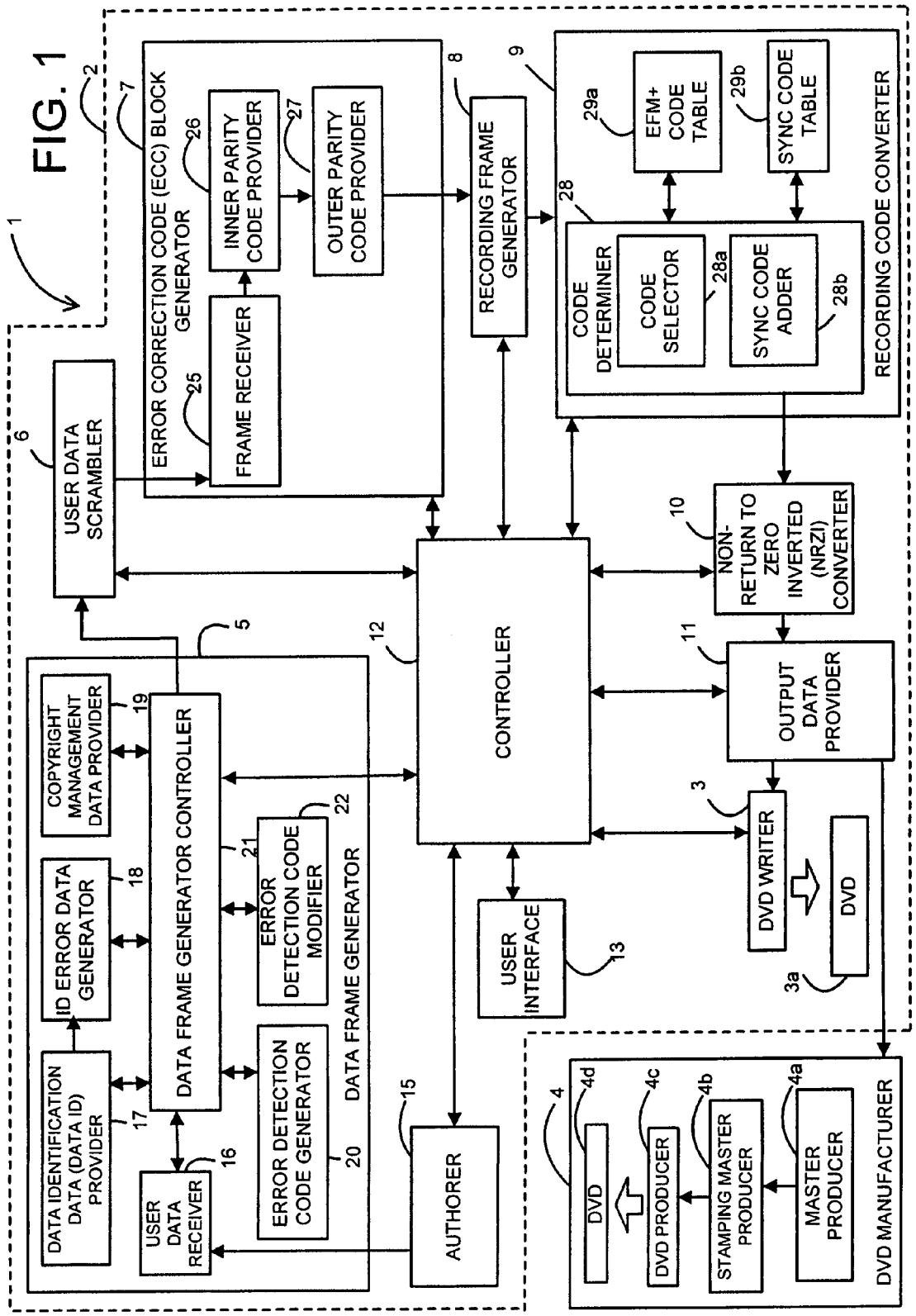
FIG. 1 shows a functional block diagram of recorded medium producing apparatus including copy-protection apparatus for producing a copy-protected recorded optical disc such as a DVD.

Referring now to FIG. 1, a production apparatus 1 has a copy-protection apparatus 2 that is operable to produce copy-protected data in accordance with a particular recording medium format, for recordal on a recording medium. In this example, the recording medium format is an optical disc format, in particular the Digital Versatile Video Disc (DVD-Video, abbreviated to DVD herein) format, and the recording medium is a DVD.

The production apparatus 1 has an output data provider 11 operable to output copy-protected data for recordal onto a recording medium. The production apparatus 1 may have a recording medium writer, in this example a DVD writer 3, coupled to the output data provider 11 for directly recording the copy-protected output data onto a writable or rewritable DVD disc or discs 3a. Alternatively or in addition, the output data provider 11 may be arranged to supply copy-protected data to a recording medium manufacturer 4 (which may be part of or separate from, even physically remote from, the production apparatus) operable, in known manner to produce recorded media, in this case DVDs, on a large scale. In this case, the production apparatus will provide a data file, for example a digital linear tape (DLT) file, for supply to the DVD manufacturer 4. The DVD manufacturer 4 will generally have a glass master producer 4a to cut a glass master, a stamping master producer 4b to produce stamping masters from the glass master stamping and a disc producer 4c to produce the final DVD discs 4d from the stamping masters.

The copy-protection apparatus 2 is, as will be explained below, operable to incorporate copy-protection by, for an item of data (that is one or more sectors in the case of a DVD) that will not form part of the navigational path of the recorded DVD, controlling production of an associated parameter that is not checked by a physical testing device such that that parameter is inconsistent with that item of data, or is otherwise not as expected, for example has been modified or corrupted, so that when an unauthorised copying apparatus, such as a file-by-file or sector-by-sector ripper, reads that sector, the unauthorised copying apparatus will report an error, thereby inhibiting copying. This enables a copy-protected recorded medium to be produced that should frustrate unauthorised copying but that can be tested by a physical testing device without the physical testing device having to be aware of the manner of copy-protection or having to use specific software (such as a software "plug-in") specifically designed for recording media having that type of copy-protection. The inconsistent parameter thus provides subversive data that will not affect a legitimate player because it is associated with a sector not on a navigational path of the recorded DVD.

The copy-protection apparatus 2 shown in FIG. 1 is operable to produce a copy-protected output data file from an authored user data file. The authored user data file will generally have been produced by an authorer 15 (an authoring program or device) that, under user control: multiplexes assets (that is data files making up the content or user data, including the video data files and any additional audio, graphics and other data files) assembled by the user of the authorer 15; adds navigation and control information (according to the appropriate recording media standard specification) to enable a player to navigate through the content of the recorded medium in the manner required by the user of the authorer 15; and writes out an authored user data file. The authorer 15 will generally also able to simulate the resulting recorded medium so that the user can review and check their work. As shown in FIG. 1, the authorer 15 may be associated with or incorporated within the copy-protection apparatus 2. As another possibility, the authorer 15 may be provided by a separate device which may be remote from the copy-protection device The copy-protection apparatus 2 has a data frame generator 5 operable to generate frames of data from an authored user data file, a user data scrambler 6 operable to scramble the authored user data using a bit shifting process to spread the user data to avoid long runs of repetitive data which may affect the ability of the encoder to correctly control digital sum value (DSV), an error correction code block generator 7 to generate code that further facilitates error correction, a recording frame generator 8 to generate recording frames or sectors from error correction code blocks generated by the error correction code block generator 7, a recording code converter 9 to produce recording code for the recording frames, a non-return to zero inverted (NRZI) converter 10 to convert the recording code to NRZI format plus the output data provider 11 mentioned above that is operable to provide the NRZI format data resulting from a received authored user data file to the local DVD writer 3 and/or the DVD manufacturer 4. The NRZI converter 10 may alternatively be part of the functionality provided by the DVD writer 3 and/or the DVD manufacturer 4, in which case the output data provider 11 will output the recording code.

The copy-protection apparatus 2 has a controller 12 to control overall operation of the copy-protection apparatus 2 and a user interface 13 operable to provide a user with information and to receive instructions from the user.

The data frame generator 5 has a user data receiver 16 operable to receive an authored user data file from the authorer 15, a data identification data provider 17 operable to provide a 4 byte sector identification (ID), an ID error data generator 18 operable to generate 2 byte error data (IED), a copyright management data provider 19 operable to provide, on the basis of user input via the user interface 13 and/or data contained in the authored user data file, copyright management data (CPR_MAI), an error detection code generator 20 operable to generate an error detection code (EDC) for a sector or frame and a data frame generator controller 21 operable to control overall operation of the data frame generator 5 to generate data frames or sectors each having (as shown as T2 in FIG. 8) a data ID, ID error data IED, copyright management data CPR_MAI, 2048 bytes of user data and error detection code EDC. The data frame generator 5 is operable to arrange the data frames or sectors in rows: 12 rows of 172 bytes in the case of the DVD-Video standard specification.

The error correction code (ECC) block generator 7 has a frame receiver 25 operable to receive a predetermined number of frames, 16 in the case of the DVD-Video standard, and to interleave the rows of those frames (to spread them apart to inhibit burst errors) into an error correction code block with, in the case of the DVD specification, each block having 192 rows of 172 bytes.

The error correction code (ECC) block generator 7 has an inner-parity code provider 26 operable, for each of the rows of a block, to calculate a 10-byte inner-parity Reed Solomon code and to append it to the right hand end of that row. The error correction code (ECC) block generator 7 also has an outer-parity code provider 27 operable to calculate an outer-parity Reed-Solomon code. In the case of the DVD specification, this is a 16-byte code which adds sixteen new rows to the array of rows (including the inner parity codes) of an error correction code block, taking the total number of rows to 208.

The recording frame generator 8 is operable to break up an ECC block provided by the ECC generator 7 into recording sectors or frames each consisting of a predetermined number (12 in the case of the DVD specification) of rows of data and a row of outer-parity codes.

The recording code converter 9 has a code determiner 28 operable to determine recording codes that minimise the absolute value of the accumulated digital sum value (DSV). The code determiner 28 has a code selector 28a operable to replace each 8-bit byte of a recording frame by a sixteen bit byte from a code table 29a (EFM plus modulation), and a SYNC code adder 28b operable to divide each recording row into two halves and to provide each half of a recording row with a SYNC code selected from a SYNC code table 29b with the 16-bit byte codes and the SYNC codes being selected with, in the case of the DVD specification, the run length limitation that between two "1"s there shall be at least two and at most ten "0"s and so as to minimise the absolute value of the accumulated digital sum value (DSV). EFM plus modulation is described in, for example, a paper entitled "EFM-Plus: The coding format of the multimedia compact disc" by Kees A. Schouhamer Immink published in IEEE transactions on Consumer Electronics, Volume CE-41, pages 491 to 497, August 1995.

The non-return to zero inverted converter 10 is operable to convert the 16-bit code words or bytes into channel bits in which a "1" is represented by a transition and a "0" is represented by the absence of a transition.

As so far described, the copy-protection apparatus is operable to carry out processes in accordance with the DVD-Video standard so as to produce the channel bits to be recorded. However, in addition to the above-described functionality, the data frame generator 5 also has an error detection code modifier 22 operable to modify the error detection code EDC for a sector that is to serve as a subversive sector or subversive data.

Figure 2:
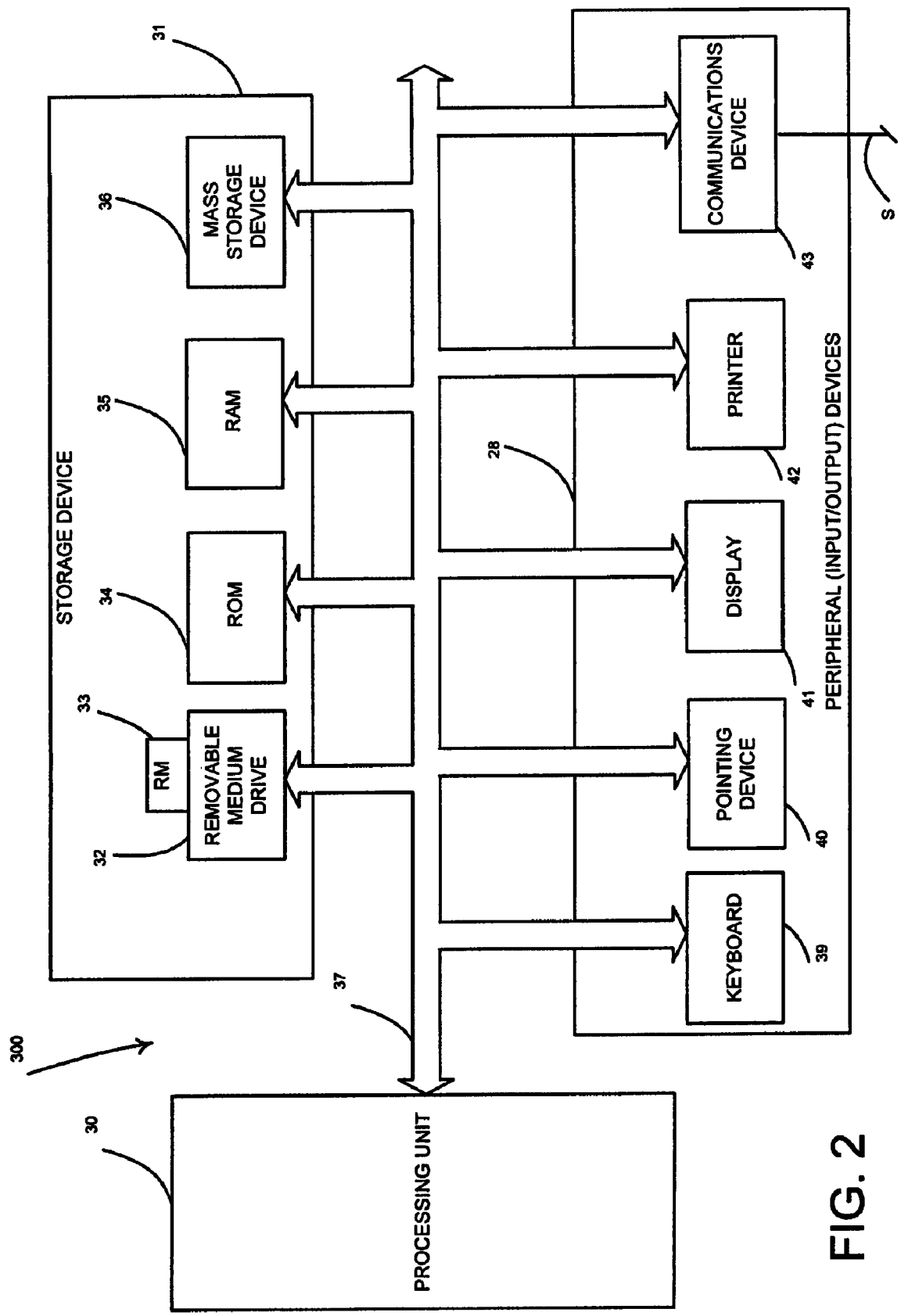
FIG. 2 shows a functional block diagram of computing apparatus that may be programmed to provide the copy-protection apparatus shown in FIG. 1.

FIG. 2 shows a functional block diagram of computing apparatus 300 that may be programmed by program instructions to provide the production apparatus 1 shown in FIG. 1 or at least the copy protection apparatus 2 shown in FIG. 1.

The computing apparatus 300 comprises a processing unit 30 coupled by one or more buses 37 to storage devices which comprise a removable medium drive 32 to receive a removable medium RM 33 (in this case a DVD drive to receive a DVD and/or a DLT drive), a read only memory (ROM) 34, a random access memory (RAM) 35 and a mass storage device 36 such as a hard disc drive.

The bus 37 also couples the processing unit 30 to a number of peripheral input/output devices that may form the user interface 13 of FIG. 1, in this case a keyboard 39, a pointing device 40 and a display 41. The peripheral devices may also include a communications device 43 to provide network communication and, optionally, a printer 42. The communications device 43 may be, for example, a MODEM, network card or the like to enable the computing apparatus 300 to communicate over a network such as any one or more of the Internet, an intranet, a local area network, wide area network or any other suitable form of network.

It will, of course, be appreciated that the storage devices and input/output devices may not comprise all of those shown in FIG. 2 and/or could comprise additional devices. For example, one or more further removable medium drives, such as a floppy disc drive, may be provided and other input/output devices such as a microphone and a loudspeaker may be provided.

Figure 3:
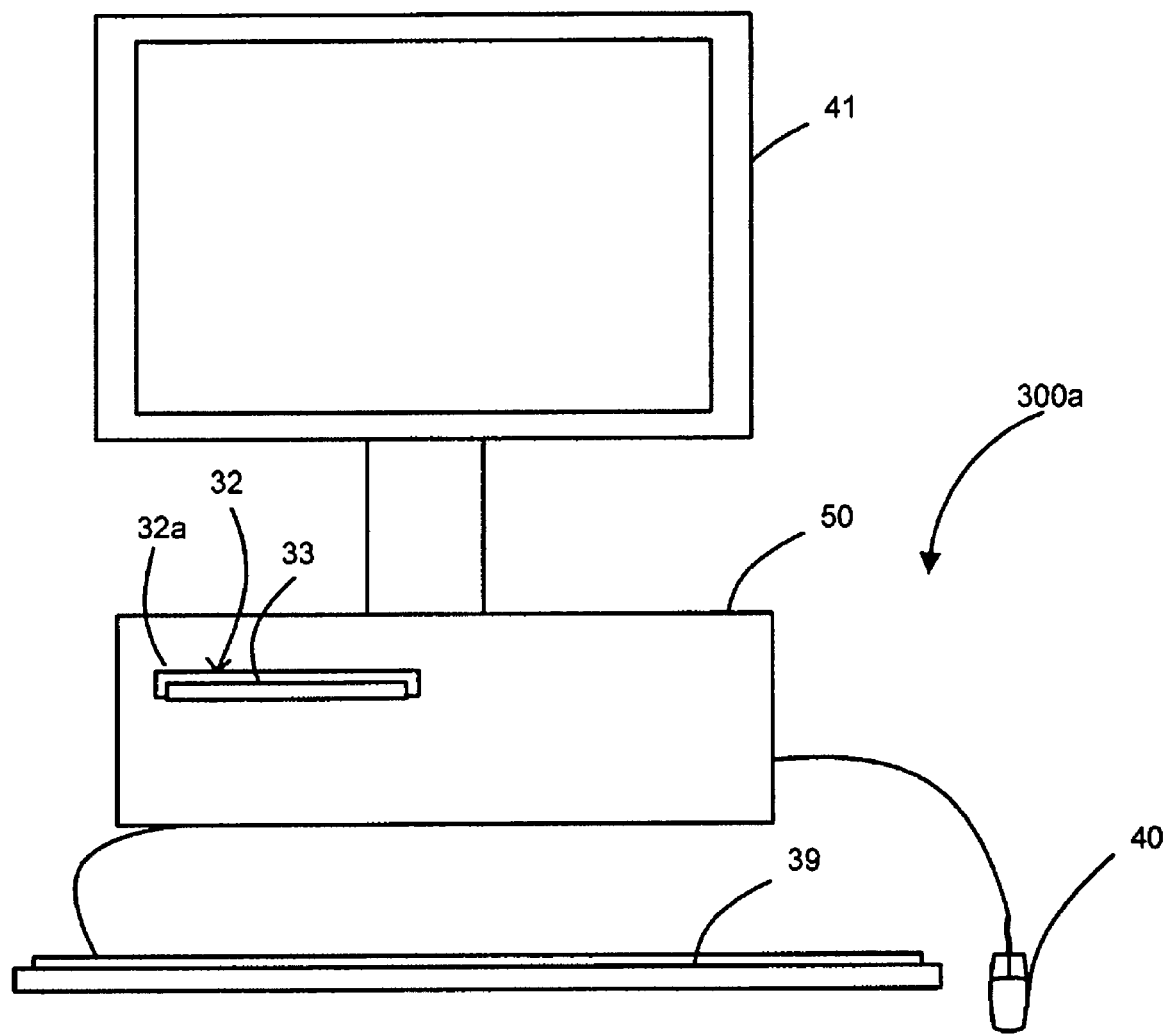
FIG. 3 shows a diagram illustrating an example of computing apparatus having the functionality shown in FIG. 2.

As shown diagrammatically in FIG. 3, the computing apparatus may be a personal computer or server 300a which has a main processor unit 50 containing the processing unit 30 and storage devices 31 and user interface devices in the form, as shown, of the keyboard 39, a mouse forming the pointing device 40 and the display 41. FIG. 3 shows a removable medium 33 (such as a DVD or DLT) being ejected from an insertion slot 32a of the removable medium drive 32.

The computing apparatus 300 or 300a may be programmed by program instructions supplied by any one or more of the following routes:
pre-stored in the ROM 34 and/or the mass storage device 36; input by a user using an input device such as the keyboard 39 and/or the pointing device 40. downloaded from a removable medium 33 received by the removable medium drive 32; and supplied as a signal S via the communications device 43.

Of course, where apparatus has different physical components, then these may be provided by programming of corresponding respective computing apparatus.

It should be appreciated that the blocks shown in FIG. 1 indicate the functionality provided by the apparatus and do not necessarily imply that this functionality is implemented by separate physical components or modules. In addition the functionality may be implemented in any appropriate manner, for example software, firmware or hardware or any appropriate combination of these.

To facilitate understanding of how the apparatus 1 shown in FIG. 1 functions, the structure of a DVD first needs to be discussed.

A DVD has a complex and non-linear structure with multiple elementary streams being interleaved and multiple discrete elements of content organized in a structured and hierarchical manner within a DVD video zone. Navigation to and through the digital presentation data stored on a DVD is controlled by navigation data which may be present at different levels in the physical data structure of the DVD video zone. The presentation data of a DVD video zone thus cannot be played simply by a player accessing the recorded data in sequential manner from the beginning to the end of the recording of the data on the DVD. Rather, the navigation path or paths taken through the content by the player depend(s) upon the navigator of the player, the way the DVD is authored, and interaction with the user.

A DVD comprises a physical data structure and a logical data structure in the form of a logical hierarchy that overlies the physical data structure. The physical data structure determines the manner in which data is organised on a DVD with, in accordance with the DVD standards, data being stored in a sequential and physically contiguous or sequential manner on the DVD. The logical data structure determines the grouping of video sequences and the play back order of blocks of video in a sequence. The data to be recorded on the disc is organised in physical sectors. Each physical sector consists of a SYNC block, a header, a data pack and error detection code. As mentioned in the above discussion of FIG. 1, in order to ensure that channel coding rules are met and to minimise the effect of defects on the disc, the data of these sectors have error correction parity codes added and are interleaved in blocks of 16 sectors (an ECC block) before channel coding in accordance with the EFM+(8 to 16 modulation) channel coding scheme of the DVD format. The channel-coded data is stored onto a DVD in the form of pits and lands. When recording the data, ISO/UDF file system information (in accordance with ISO9660/UDF (Universal Disc Format)) is recorded on the disc so that a DVD player can subsequently locate and therefore access each sector of the disc. The final data recorded on a single layer DVD consists of a lead-in section, then the program data section, and then a lead-out section.

Figure 4:
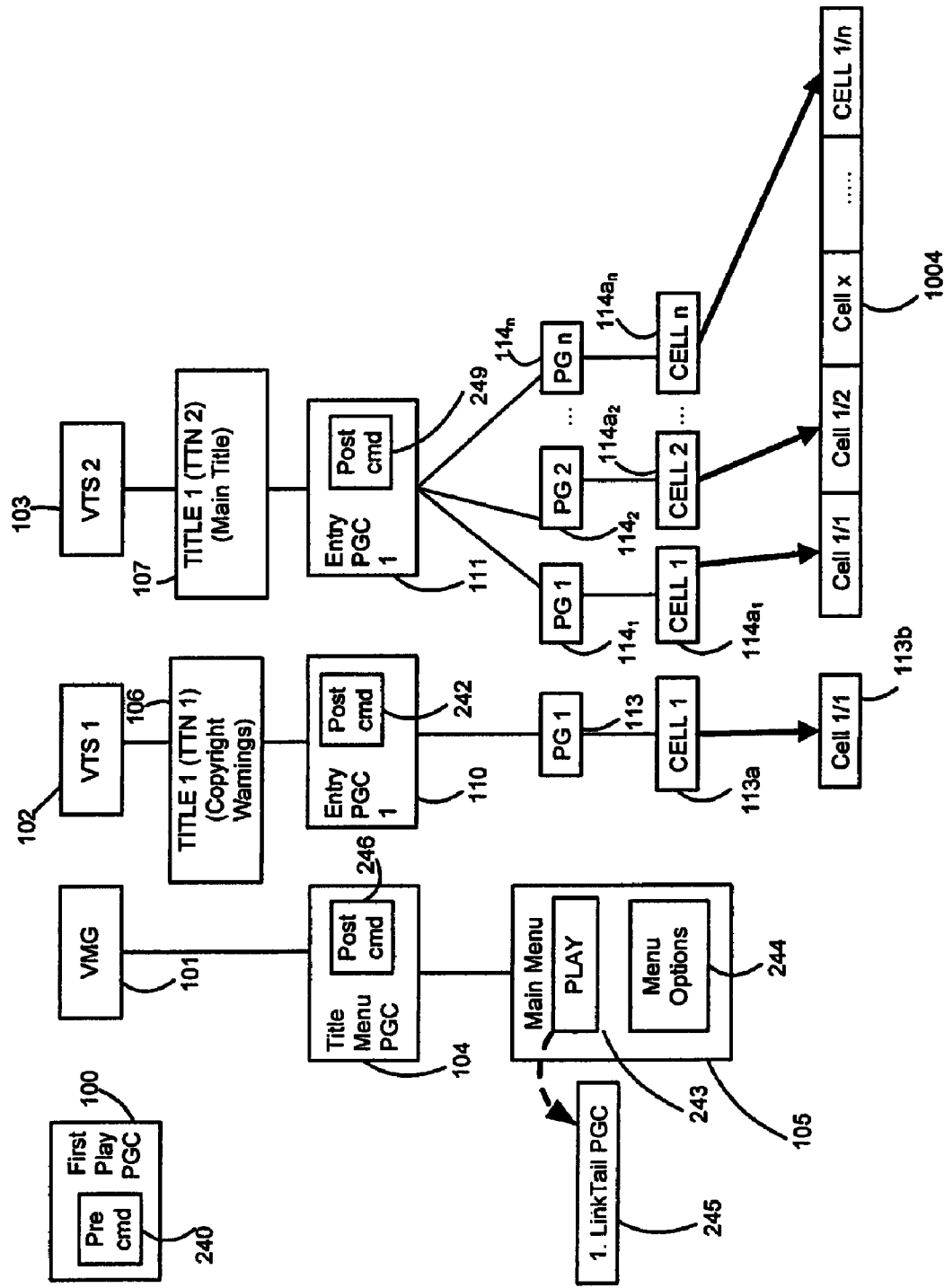
FIG. 4 shows a diagram for explaining the navigational and presentation data structure of an example of a DVD Video zone.
Figure 5:
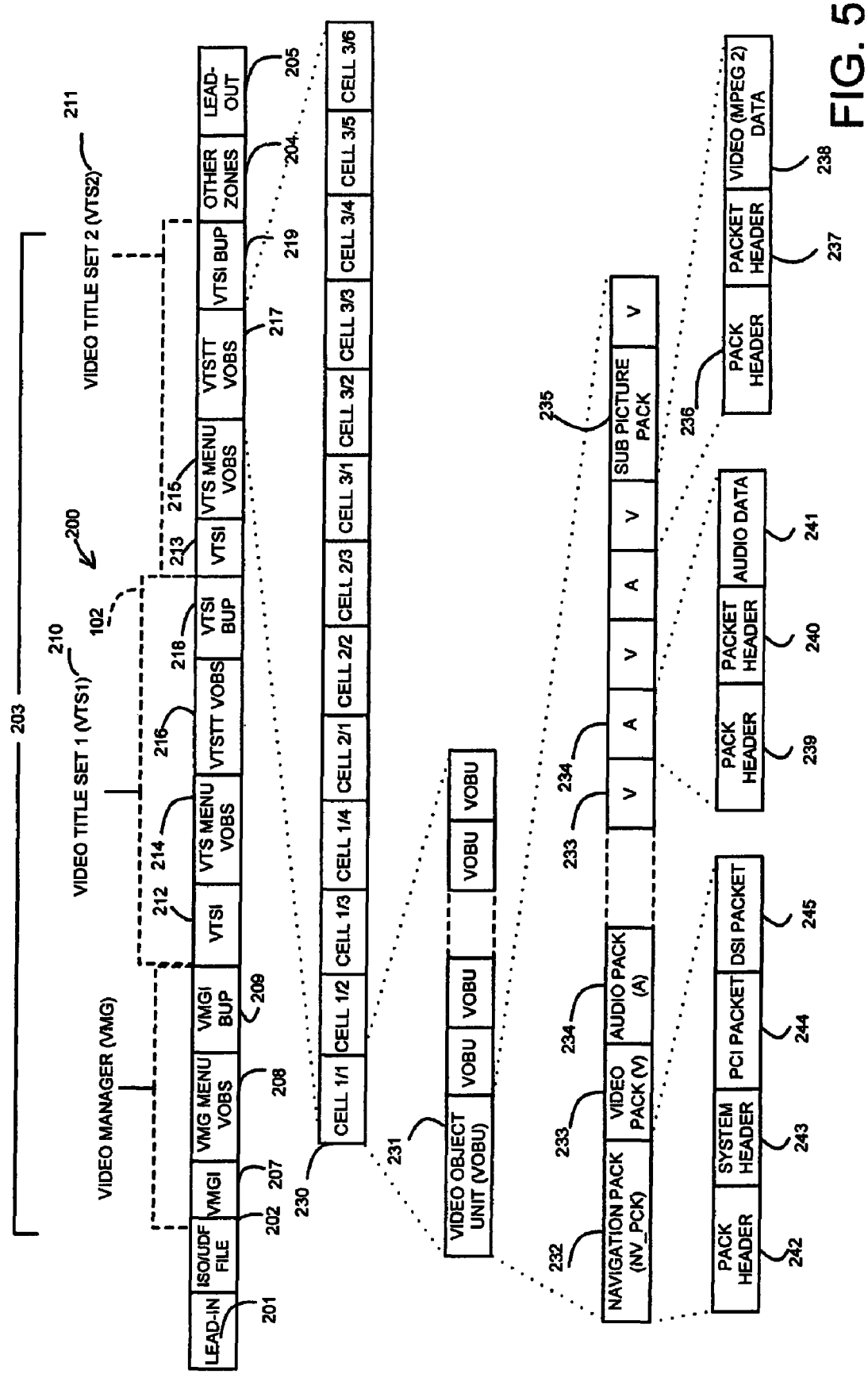
FIG. 5 shows a diagram for explaining the physical data structure of a DVD data file corresponding to a DVD video zone.

FIG. 4 shows a diagram for explaining, by way of an illustrative example, the presentation and navigation data structure of a DVD while FIG. 5 shows a diagram for illustrating the structure of a DVD Video zone.

As shown in FIG. 4, the navigation data structure comprises a first play program chain (PGC) 100 which is the first program chain to be executed when the disc is first inserted into a DVD player, a video manager (VMG) 101 and video title sets (VTSs).

The video manager 101 provides control information for the entire DVD video zone. In the example shown in FIG. 4, the video manager 101 has a title menu program chain 104 which, as shown, corresponds to the main menu 105. However, the DVD video zone need not necessarily have a title menu.

The number of video title sets will depend upon the particular DVD structure. FIG. 4 shows two video title sets, a first video title set VTS1 102 for introductory data such as copyright warnings and the like and a video title set VTS 2 103 for the main content of the DVD (which content may be a film (movie), music video, or the like).

Each video title set will usually have a language folder and one or more title folders. The language folder is associated with one or more menu program chains (PGCs) for providing menus to be displayed to the user to enable the user to select various options such as language, cut, aspect ratio (widescreen or not) and so on, while the title folder is associated with at least one title program chain (a title may contain up to $2^{15}$ program chains). For simplicity, FIG. 4 shows only the title folders. In the example illustrated, the first video title set VTS1 102 has a single title folder 106 (Title 1 (TTN 1)) for copyright warnings and the video title set VTS 2 103 has a single title folder 107 (Title 1 (TTN 2).

Each title folder 106 and 107 has at least one program chain (PGC). The first program chain in a video title set is known as the entry program chain ("entry PGC"). As shown in FIG. 4, each title folder has a single program chain 110 and 111. The program chains 110 and 111 therefore form the entry PGCs.

Each program chain comprises program chain information (PGCI) comprising navigation data which controls access to components of a program chain and contains from 0 to 99 programs (PG). A program chain may contain no programs but only PGCI. Such a program chain is known as a dummy program chain. For example, the first play program chain is a dummy program chain. The program chains have pre-commands and post-commands that define the order in which the program chains are accessed by a player. In the example shown in FIG. 4, a pre-command 240 of the first play PGC 100 causes a player to jump to the title 1(TTN 1) title folder 106 and then to play the copyright warnings of the entry program chain 110 of first video title set 102. The entry program chain 110 has a post-command 242 to cause the player to jump to the title menu entry program chain 104 of the Video Manager and to display the main menu which in this example has a play button 243 and other menu options 244. A link tail PGC command 245 is provided to cause, in response to selection of the play button 243 by a user of the player, the player to exit the main menu and then execute a post command 246 of the title menu entry program chain 104 to cause the title VTS 2 (which constitutes the main title in this example) to be played. The entry program chain 110 of the main title has a post command 249 to cause the player to return to the main menu after playing the title. The navigation path or paths through the DVD are thus at least partly defined by the per-commands and post-commands.

As an illustration, FIG. 4 shows the program chain 110 as having a single program (PG 1) 113 and the program chain 111 as having n programs (PG 1 to PG n) $114_1$ to $114_n$.

Each program has a logical cell or a sequence of logical cells that map to a corresponding physical cell or physical cells of the presentation data structure. In the example of FIG. 4, each program 113 and $114_1$ to $114_n$ has a single logical cell $113a$ and $114a_1$ to $114a_n$. In the example shown, the logical cell $113a$ maps to a single physical cell $113b$. The logical cells $114a_1$ to $114a_n$ map to a set of physical cells Cell1/1 to Cell 1/m. In the example shown, each logical cell maps to a corresponding physical cell, that is m=n, although this need not be the case. The data also includes at least one physical cell, such as cell x 1004 in FIG. 4, that is not pointed to by any logical cell.

It will of course be appreciated that FIG. 4 is only an example and that different configurations are possible.

It will of course be appreciated that FIG. 4 is a very simple example and that a DVD may contain more video title sets and that a video title set may contain many more titles, program chains, programs and cells than are shown in FIG. 4. Also the mapping between logical and physical cells need not be one to one and the physical cells may well be ordered differently from the logical cells.

FIG. 5 shows a DVD volume layout 200. A DVD volume layout has a lead-in 201 followed by ISO/UDF file system information 202, a DVD video zone 203, possibly one or more other zones 204, and finally a lead-out 205. The DVD video zone has a video manager (VMG) 206 consisting of video manager information (VMGI) 207 comprising navigation data for the entire DVD video zone in a single file identified as VIDEO_TS.IFO, a video manager menu video object set (VMG MENU VOBS) 208 provided as a single file identified as VIDEO_TS.VOB, and a back up file of the video manager information (VMGI BUP) 209 in a single file VIDEO_TS.BUP. The video manager menu video object set 208 usually includes the presentation data for the title menu and any other non-dummy menu program chains.

FIG. 5 shows two video title sets VTS 1 and VTS 2 210 and 211. Each video title set (VTS) consists of video title set information (VTSI) 212 and 213 comprising navigation data to control the presentation of titles and menus in the video title set in a single file VTS_##_0.IFO (where ## represents a two digit number between 01 and 99 representing the video title set number), a menu video object set for any video title set menu video objects (VTS MENU VOBS) 214 and 215 which typically contains the content for all types of menu within the video title set in a single file VTS_##_0.VOB (there may be no menus within the video title set and so no VTS MENU VOBS), a video title object set (VTSTT VOBS) 216 and 217 for the video title set in one or more files identified as VTS_##_@.VOB (where @ is single digit number between 1 and 9) and a back up of the video title set information (VTSI BUP) 218 and 219 in a single file identified as VTS_##_0.BUP.

As shown in FIG. 5, the video title sets are arranged one after another and so that, for each video title set (VTS), the video title set information (VTSI) is followed by any menu video object set (VTSI MENU VOBS), then the video title object set (VTSTT VOBS) for the video title and finally the back up of the video title set information (VTSI BUP).

Each video object set (VOBS) consists of a sequence of physical cells. For clarity in the diagram, FIG. 5 shows part of the physical cell set (CELL1/1 to CELL 1/n) only for the video title object set 217 of the video title set 2 (VTS 2) 211. Each physical cell consists of one or more video object units (VOBUs) which each represent approximately 0.4 to one second of playback time (that is a number of consecutive frames). For simplicity in FIG. 5, the structure of only one physical cell 230 and one video object unit (VOBU) 231 of that physical cell 230 are shown.

As shown in FIG. 5, each video object unit consists of a navigation pack (NV_PCK) 232 followed by an integer number of video (V), audio (A) and sub-picture (S) packs 233, 234 and 235. On a DVD, each pack occupies one sector of user data on the disc (2048 bytes). Each video pack 233 consists of a pack header 236 identifying the pack followed by a packet header 237 identifying the packets within the pack and then the video data 238 in accordance with the DVD format, that is MPEG2 format. Similarly, each audio pack consists of a pack header 239 identifying the pack followed by a packet header 240 identifying the packets within the pack and the audio data 241 which may be in any format appropriate for DVD, for example MPEG, DTS, DD, LPCM, AC3.

Each navigation pack (NV_PCK) 232 consists of a pack header 242 identifying the pack, followed by a system header 243 and two navigation data packets 244 and 245. The first of the two packets 244 comprises presentation control information (PCI) for controlling control menu display and program presentation in real time and the second packet 245 comprises data search information (DSI) for controlling forward/reverse scanning and seamless branching. DVD players contain a track buffer to enable variable rate and seamless playback. There is therefore a time delay reading by the read head and decoding and playing of the audio and video data. Therefore real time control information is distributed between and stored within the PCI and DSI packets and the player checks and utilises this information before and after the corresponding physical cell passes through the track buffer. Navigation packs 232 are thus used by the navigation engine or navigator of the DVD player to ensure playback, trick play modes and search operations are executed successfully and in a timely manner.

It will be understood from the above that the DVD video zone thus includes navigation data that controls access and interactive playback and that navigation data exists at different levels within the DVD video zone. The navigation data includes control commands (for example for format, language, audio selection, sub-picture selection, parental management, display mode and display aspect), navigation commands (for example for general system parameters, system parameters, navigation timer and menu buttons), and search and user interface commands (for example for PGCI searches to enable selection of a particular menu or presentation data searches enable selection of a title, part of title (chapter), and so on).

In a program chain, the program chain information (PGCI) comprises navigation data such as, for example: the number of the programs within the chain; prohibited user operations; links between program chains; playback mode; pre-commands to be executed before accessing any of the programs of the chain; cell commands; and post-commands to be executed after accessing the programs of the chain.

The explanation above with respect to FIGS. 4 and 5 is a simplified overview of the DVD format and that for a more detailed description of the DVD format and recording process, reference should be made to the DVD standards.

The manner in which the copy protection apparatus 2 shown in FIG. 1 operates to produce copy-protected data and the subsequent recording of that copy-protected data on a DVD will now be described with the aid of FIGS. 6 to 9

When a user instructs the production apparatus 1 shown in FIG. 1 that a DVD video zone is to be produced, where the authorer 15 is part of the apparatus, then the controller 12 will generally prompt the user via the user interface 13 to provide the required assets for the authorer 15 which then assembles the assets in the manner the user desires with user-defined chapters and menus and a user-defined navigation path or paths through the content data, multiplexes the user selected and organised assets and adds navigational, and control data in compliance with the user's instructions and provides an image file, DDP file set or VIDEO_TS directory containing the VOB, IFO, BUP files to the copy protection apparatus. The authored data will include at least one sector of data that is not on any navigational path, that is a sector that has at least one physical cell that is not pointed to by any logical cell such as the cell x 1004 in FIG. 4. Of course, if the authorer is a separate apparatus then the user will interface with the authorer via its own user interface.

Figure 6:
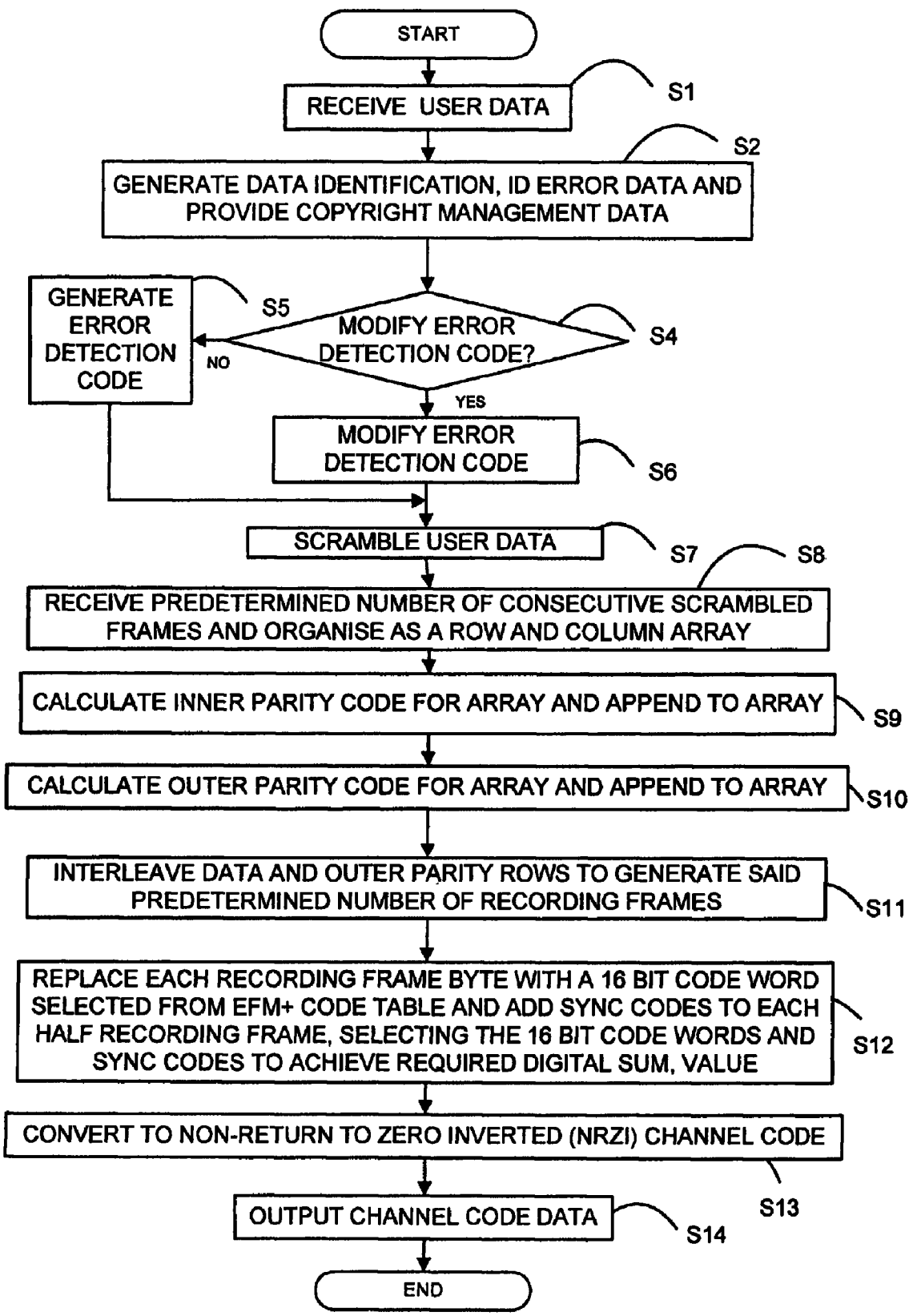
FIG. 6 shows a flow chart for explaining operation of the copy-protection apparatus shown in FIG. 1.

FIG. 6 shows the operations carried out by the copy-protection apparatus 2 for a sector or frame of data. At S1 in FIG. 6, a sector of data is received from the authorer 15 (T1 in FIG. 8). At S2 the data identification data provider 17 provides the 4 byte sector identification (ID), the ID error data generator 18 generates the 2 byte error data (IED) and the copyright management data provider 19 provides, on the basis of user input via the user interface 13 and/or data contained in the authored user data file, copyright management data (CPR_MAI). These processes may be carried out in any appropriate order.

At S4, the error detection code modifier 22 determines on the basis of information provided to the data frame generator controller 21 by the controller 12 whether or not the error detection code is to be rendered inconsistent with the corresponding data by, for example, modification or corruption, that is whether not this sector comprises a physical cell (such as the cell x 1004 in FIG. 4) that is not pointed to by any logical cell and that therefore can be used to provide the subversive data. If the answer is no, then at S5 the error detection code generator 20 generates the error detection code for the sector in the conventional manner using the polynomial set out in the corresponding DVD standard. If however the answer at S4 is yes, then at S6 the error detection code modifier 22 causes the error detection code produced by the error detection code generator to be modified or corrupted so that it is not as it should be for the associated data, that is it is inconsistent with the associated data. The error detection code may be corrupted or may be modified by causing the error detection code generator 20 to use a different technique from that set out in the appropriate standard to generate the error detection code, for example by causing the error detection code generator 20 to use a different polynomial from that set out by the standard to generate the error detection code or by substituting a randomly selected incorrect value.

Each data frame or sector generated by the data frame generator 5 thus has (as shown as T2 in FIG. 8) a data ID, ID error data IED, copyright management data CPR_MAI, 2048 bytes of user data and error detection code EDC and the error detection code is modified or corrupted for any subversive sector. The data frame generator 5 arranges the data frames or sectors in rows: 12 rows of 172 bytes in the case of the DVD-Video standard specification.

Figure 8:
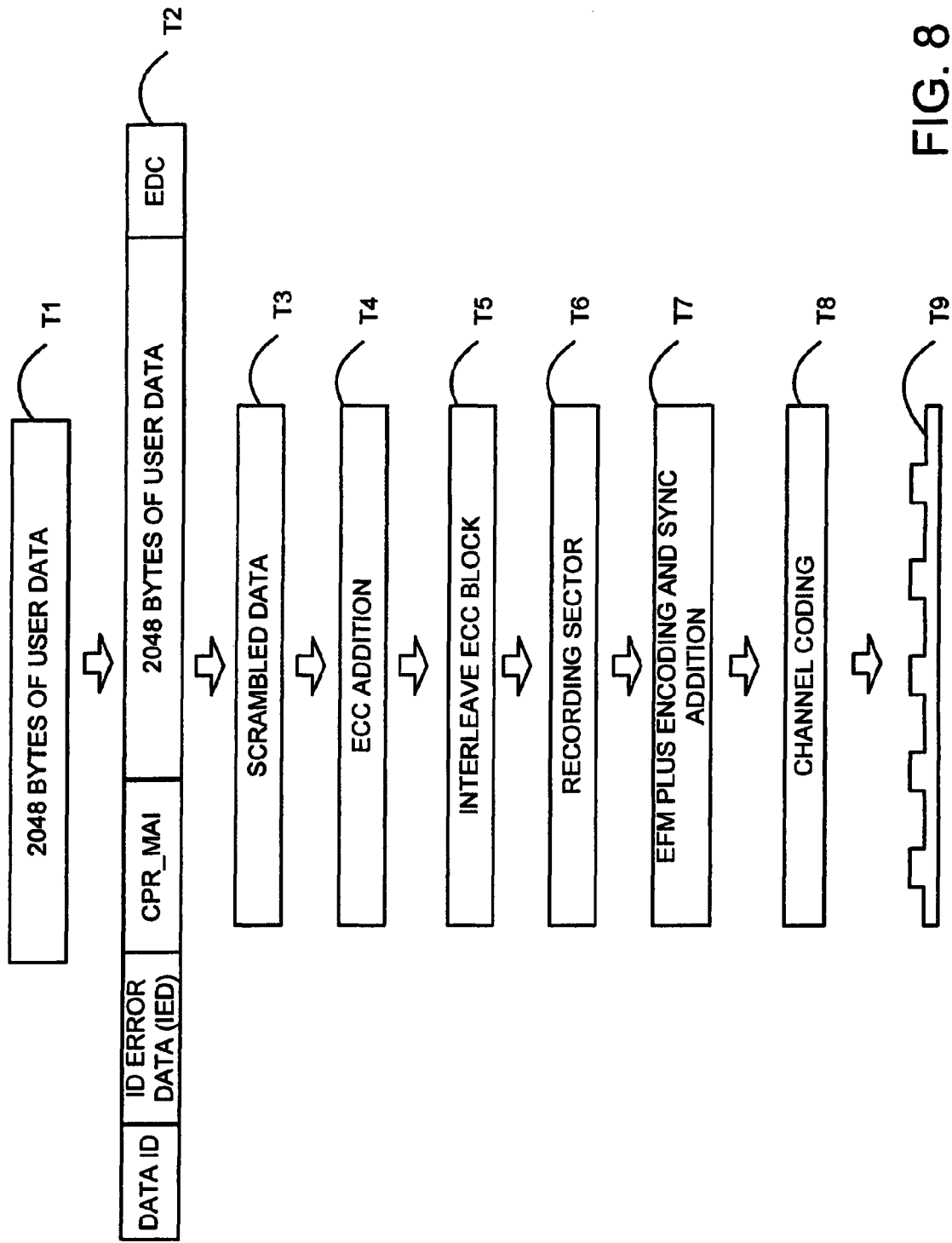

At S7 the user data scrambler 6 scrambles all recording sector data, that is all 2064 bytes, of each generated data frame, as shown at T3 in FIG. 8.

At S8, the frame receiver 25 of the error correction code (ECC) block generator organises a predetermined number of scrambled frames, 16 in the case of the DVD-Video standard, into an error correction code block with, in the case of the DVD specification, each block having 192 rows of 172 bytes.

At S9, the inner-parity code provider 26 calculates, for each row, a 10-byte inner-parity Reed Solomon code and appends it to the right hand end of that row of the error correction code block (ECC block). Then, at S10, the outer-parity code provider 27 calculates a 16-byte outer-parity Reed-Solomon code for the block (including the inner parity codes), adding sixteen new rows to the array of rows of an error correction code (ECC) block, taking the total number of rows to 208. At S11, the recording frame generator 8 interleaves the data and parity rows (T5 in FIG. 8) of each ECC block provided by the ECC generator 7 and at S12 breaks up the interleaved ECC blocks into recording sectors or frames each consisting of a predetermined number (12 in the case of the DVD specification) of rows of data and a row of outer-parity codes (T6 in FIG. 8).

At S12 in FIG. 6, the code determiner 28 replaces each 8-bit byte of a recording sector by a sixteen bit byte from the code table 29a (EFM plus modulation) and the SYNC code adder 28b divides each recording frame into two halves and provides each half of a recording frame with a SYNC code selected from a SYNC code table 29b. The 16-bit byte codes and the SYNC codes are selected in accordance with the DVD specification so that between two "1"s there are be at least two and at most ten "0"s and so as to minimise the absolute value of the accumulated digital sum value (DSV) (T7 in FIG. 8).

At S13, the non-return to zero inverted converter 10 converts the 16-bit code words or bytes into channel bits in which a "1" is represented by a transition and a "0" is represented by the absence of a transition and at the channel code data is supplied to the output data provider 11.

Once the processes shown in FIG. 6 have been completed for all sectors or frames, the resultant image file comprising the channel code data for all sectors (T8 in FIG. 8) is stored by the output data provider 11 or output to the DVD writer 3 or stored onto DLT for supply to a DVD manufacturer 4.

Figure 7:
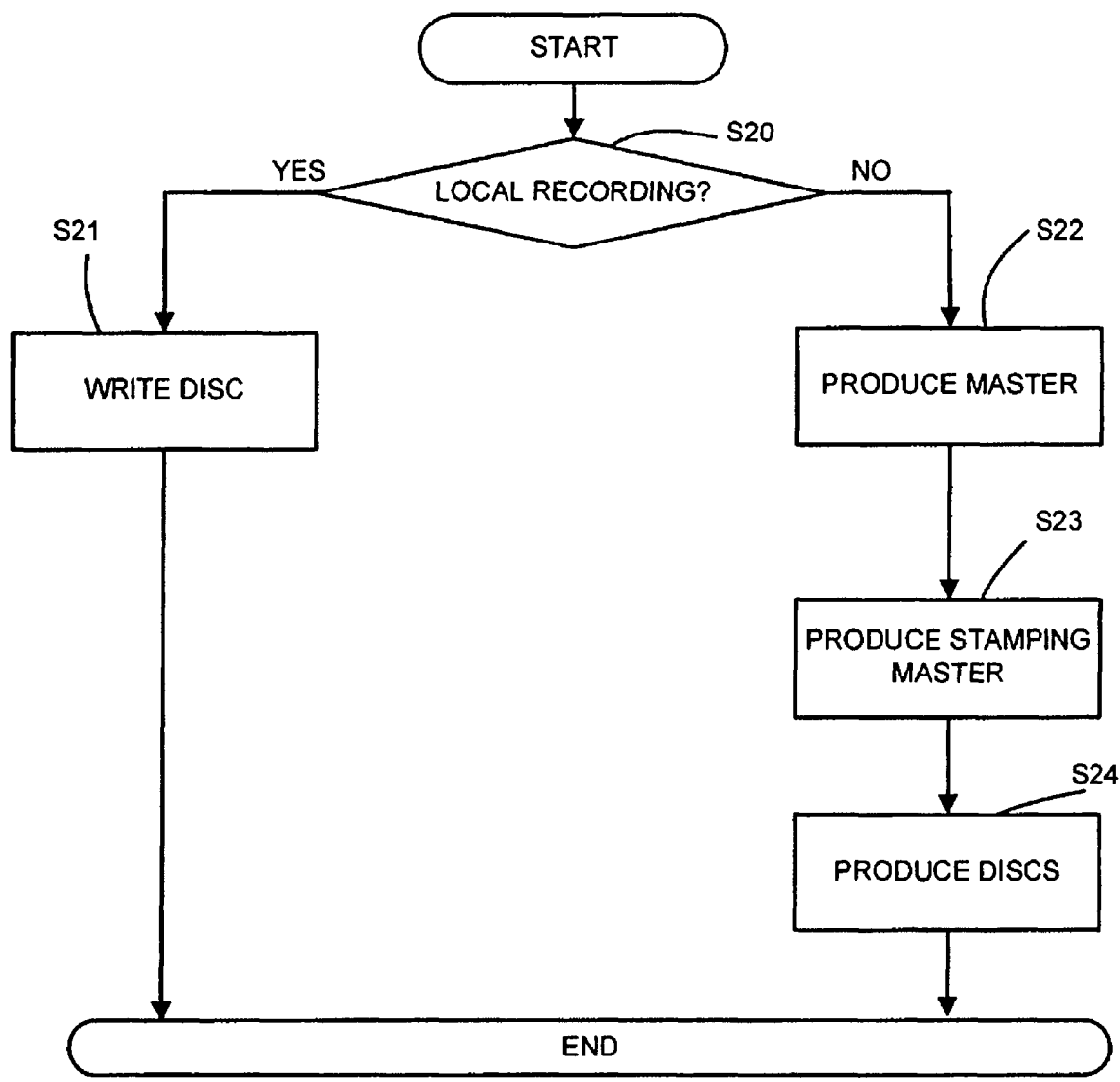
FIGS. 7 and 8 show a flow chart and a diagram, respectively, for explaining a recording operation.

FIG. 7 shows a flow chart illustrating recording of the image data file onto a DVD.

At S20, the controller 12 determines whether a user has input instructions via the user interface to effect local recording by the DVD writer 3. If the answer is yes, then the controller 12 determines that recording by the DVD writer 3 is desired and at S21 causes the output data provider 11 to supply the image file to the local recorder 12 which writes the image file onto a writable DVD disc in the normal manner. If however, the answer at S20 is no, then the controller causes the output data provider 11 to record the image file onto a digital linear tape. At S22, the digital linear tape is used by the master producer 4a to produce a glass master carrying the image file. Then at S23 the stamping master 4b produces stamping masters from which, at S24, the DVD producer 4c produces the final DVD discs (T9 in FIG. 8).

As described above, subversive data is produced by controlling production of the error detection code of a sector not on any navigation path so that it is inconsistent with the data of that sector, that is it is modified or corrupted in comparison to the error detection code that would have otherwise been produced for that sector. The subversive data may however be produced by modifying or corrupting any parameter that: 1) is not checked by a physical testing device; 2) is associated with a sector or area of the recorded medium that is not part of any navigational path that will be followed by a legitimate player; and 3) will be checked by an unauthorised copying apparatus such as a file-by-file or sector-by-sector ripper.

In the above-described embodiments, the recording medium is a DVD. The recording medium may be another form of optical disc with of course any appropriate modifications to the above-described production process so that the optical disc complies with the appropriate standard. It will, of course, be appreciated that the present invention may be applied to any other form of digital recording media from which content data that can be accessed in a non-sequential manner using navigational data stored by the recording medium, such as, for example, magnetic or magneto-optical recording discs and possibly other digital recording media such as Digital Linear Tape which is transported along a path past, rather than rotated with respect to, a read/write head, or may be any other form of recording medium from which content data that can be accessed in a non-sequential manner using navigational data stored by the recording medium. The recording medium may be a precursor to the product that is supplied to the end user, for example in the case of an optical disc the recording medium may be a Digital Linear Tape, a glass master, or a stamping master.

What is claimed is:

1. A method for copy-protecting data to be recorded onto an optical disc, the data to be recorded comprising content data and control data, the control data enabling an optical disc player to navigate a path through the content data, the method comprising:

choosing a parameter associated with an item of content data not on the path wherein the parameter is not checked by a physical testing device which detects inner or outer parity codes and is an error detection code (EDC) for said item of content data;

modifying the parameter such that the parameter is inconsistent with the item of data and wherein the modified parameter provides subversive data that does not affect a legitimate optical disc player and wherein the modified parameter is appended to user data of said item of content data; and recording the data with the modified parameter onto the optical disc without modifying an error correction code (ECC) associated with said item of content data thereby causing an optical disc copying device, which encounters the data with the inconsistent parameter, thereby reading the item of data, to report an error wherein copying of the copy-protected data by the optical disc copying device is inhibited.

2. A method according to claim 1, wherein the parameter is determined in a different manner than error detection codes for items of data on the path.

3. A method according to claim 1, wherein the copy-protected recording data is produced in accordance with a DVD standard.

4. A method according to claim 1, further comprising outputting the copy-protected data to be recorded to a recorded medium manufacturer.

5. A copy-protected recording on an optical disc the recording comprising:

content data and control data, the control data enabling an optical disc player to navigate a path through the content data;

a parameter associated with an item of content data not on the navigation path wherein the parameter is not checked by a physical testing device which detects inner or outer parity codes and is an error detection code (EDC) for said item of content data and wherein the parameter is modified to be inconsistent with the item of data and wherein the modified parameter is appended to user data of said item of content data, the modified parameter thereby causing an optical disc copying device, which encounters the data with the inconsistent parameter, thereby reading the item of data, to report an error, wherein copying of the copy-protected data by the optical disc copying device is inhibited without modifying an error correction code (ECC) associated with said item of content data.

6. A non-transitory computer-readable medium storing program instructions to program a processor to carry out the method of claim 1.

7. A method according to claim 1, wherein the optical disc copying device copies file-by-file or sector-by-sector.

* * * * *